US009659293B2

(12) United States Patent
Dunwoody

(10) Patent No.: US 9,659,293 B2
(45) Date of Patent: May 23, 2017

(54) MONEY TRANSFER SMART PHONE METHODS AND SYSTEMS

(71) Applicant: The Western Union Company, Englewood, CO (US)

(72) Inventor: Kimberly Dunwoody, Parker, CO (US)

(73) Assignee: The Western Union Company, Englewood, CA (US)

( * ) Notice: Subject to any disclaimer, the term of this patent is extended or adjusted under 35 U.S.C. 154(b) by 0 days.

(21) Appl. No.: 13/894,436

(22) Filed: May 15, 2013

(65) Prior Publication Data

US 2013/0254103 A1    Sep. 26, 2013

Related U.S. Application Data

(63) Continuation of application No. 12/756,825, filed on Apr. 8, 2010, now Pat. No. 8,458,088.

(51) Int. Cl.
*G06Q 20/10* (2012.01)
*G06Q 20/38* (2012.01)
*G06Q 20/22* (2012.01)
*G06Q 20/32* (2012.01)
*G06Q 20/40* (2012.01)
*G06Q 40/00* (2012.01)
*G06Q 40/04* (2012.01)

(52) U.S. Cl.
CPC ........... *G06Q 20/381* (2013.01); *G06Q 20/10* (2013.01); *G06Q 20/223* (2013.01); *G06Q 20/227* (2013.01); *G06Q 20/32* (2013.01); *G06Q 20/3221* (2013.01); *G06Q 20/40* (2013.01); *G06Q 40/00* (2013.01); *G06Q 40/04* (2013.01)

(58) Field of Classification Search
CPC .... G06Q 40/06; G06Q 20/327; G06Q 20/328; G06Q 20/3224
USPC ............................... 705/39, 41, 42
See application file for complete search history.

(56) References Cited

U.S. PATENT DOCUMENTS 5,969,974 A    10/1999  Vandenbelt et al.
6,311,170 B1   10/2001  Embrey
(Continued)

OTHER PUBLICATIONS

NYCE Takes the Wraps Off New Technology for P2P Payments EFT Report 23.24 (Nov. 29, 2000).*
(Continued)

*Primary Examiner* — Jagdish Patel
(74) *Attorney, Agent, or Firm* — Kilpatrick Townsend & Stockton LLP

(57) ABSTRACT

A method includes establishing a first funds transfer account associated with a first device and a second funds transfer account with a second device, funding at least the first fund account, and selecting the second device as the recipient of a funds transfer from the first device. The method further includes sending a communications link request from the first device to the second device and receiving acceptance of the communications link request from the second device. The method then establishes a communications link between the first device and the second device, initiates a funds transfer from the first device to the second device, wherein the amount is designated at the first device, and verifies the funds transfer amount, the first funds transfer account, and the second funds transfer account. Then, the method transfers the amount to the second funds transfer account associated with second device.

19 Claims, 7 Drawing Sheets

(56) References Cited

U.S. PATENT DOCUMENTS

| | | | |
|---|---|---|---|
| 6,600,919 B1 | 7/2003 | Kawase | |
| 6,678,401 B2 | 1/2004 | Jones et al. | |
| 7,620,636 B2 | 11/2009 | Fasciano | |
| 7,707,106 B1* | 4/2010 | Swanson, Sr. | G06Q 20/10 705/35 |
| 8,131,645 B2* | 3/2012 | Lin et al. | 705/51 |
| 8,225,997 B1* | 7/2012 | Bierbaum | G06Q 20/0453 235/375 |
| 8,233,841 B2* | 7/2012 | Griffin et al. | 455/41.1 |
| 8,407,121 B2* | 3/2013 | Paintin | 705/35 |
| 8,458,088 B2 | 6/2013 | Dunwoody | |
| 8,750,901 B1* | 6/2014 | Gupta | G06Q 20/3223 455/456.1 |
| 9,373,112 B1* | 6/2016 | Henderson | G06Q 20/40 |
| 2002/0023053 A1 | 2/2002 | Szoc et al. | |
| 2003/0026404 A1 | 2/2003 | Joyce et al. | |
| 2004/0210519 A1* | 10/2004 | Oppenlander et al. | 705/39 |
| 2006/0212390 A1 | 9/2006 | Gruber | |
| 2007/0026904 A1* | 2/2007 | Matsuda | H04M 3/4288 455/569.2 |
| 2007/0095892 A1 | 5/2007 | Lyons et al. | |
| 2008/0313057 A1 | 12/2008 | Gooch et al. | |
| 2009/0112757 A1 | 4/2009 | Hammad et al. | |
| 2010/0042535 A1* | 2/2010 | Stone | 705/39 |
| 2010/0331043 A1 | 12/2010 | Chapman et al. | |
| 2011/0065384 A1* | 3/2011 | Cader | H04M 3/58 455/41.1 |
| 2011/0313922 A1* | 12/2011 | Ben Ayed | 705/42 |
| 2013/0036051 A1* | 2/2013 | Giordano | G06Q 20/325 705/44 |

OTHER PUBLICATIONS

U.S. Appl. No. 14/225,450, filed Mar. 26, 2014 Non-Final Office Action mailed Feb. 3, 2015, 14 pages.

U.S. Appl. No. 14/225,450, filed Mar. 26, 2014 Final Office Action mailed Feb. 3, 2015, 12 pages.

U.S. Appl. No. 14/225,440, filed Mar. 26, 2014 Non-Final Office Action mailed Feb. 11, 2015, 15 pages.

U.S. Appl. No. 14/225,440, filed Mar. 26, 2014 Final Office Action mailed Jul. 29, 2015, 14 pages.

Caldwell and Carter; Developing Ethical Standards in Charitable Fund Raising, Trauses & Estates; Feb. 1994, 3 pages.

NYCE Takes the Wraps Off New Technology for P2P Payments EFT Report 23.24 (Nov. 29, 2000), 8 pages.

* cited by examiner

MONEY TRANSFER SMART PHONE METHODS AND SYSTEMS

This continuation application claims priority to U.S. patent application Ser. No. 12/756,825, filed on Apr. 8, 2010, entitled "MONEY TRANSFER SMART PHONE METHODS AND SYSTEMS", which is hereby incorporated herein by reference.

BACKGROUND OF THE INVENTION

This invention relates generally to money transfers. More specifically, the invention relates to money transfers utilizing smart phone technology.

Typically, setting up and executing a money transfer may not be convenient. For example, transferring money in a casual setting (i.e., among friends at a restaurant) is not possible. With current implementations the sender would have to go to an agent location, initiate a money transfer, and then the receiver would have to go to the agent location to retrieve the funds. Additionally, currency conversion is a difficult process. Determining exchange rates, finding currency exchange locations, etc. can be inconvenient and difficult. Lastly, collaborative money transfer and social networking does not exist today. Hence, improvements in the art are needed.

BRIEF SUMMARY OF THE INVENTION

The systems and methods described include a method of transferring funds between mobile devices. The method includes establishing a first funds transfer account associated with a first mobile device and a second funds transfer account with a second mobile device, funding at least the first fund account, and selecting the second mobile device as recipient of a funds transfer from the first mobile device. The method further includes sending a communications link request from the first mobile device to the second mobile device and receiving acceptance of the communications link request from the second mobile device. In response to the acceptance, the method includes establishing a communications link between the first mobile device and the second mobile device, initiating a funds transfer from the first mobile device to the second mobile device, wherein an amount is designated at the first mobile device, and verifying, by a processing center, the funds transfer amount, the first funds transfer account, and the second funds transfer account. Then, in response to verification of the funds transfer, transferring the amount to the second funds transfer account associated with second mobile device.

Another embodiment includes a method of providing currency exchange. The method includes photographing, by a camera device within a mobile device, an image of currency of a first country's currency, based on the image, determining a first amount and a country of origin of the currency, and determining, using location services of the mobile device, a current location of the mobile device. The method further includes, based on the current location, determining a second country's currency, determining an exchange rate between the first country's currency and the second country's currency, and calculating a second amount in the second country's currency based on the first amount and the exchange rate.

In yet another embodiment, a method of implementing a collaborative funds transfer is provided. The method includes initiating, by an entity, a collaborative funds transfer request within a collaborative environment, verifying the entities identity, and receiving funds for the entity from a plurality of participants within the collaborative environment. The method further includes providing an interface to the collaborative environment configured to receive content about the funds transfer request from the plurality of participants and the entity and providing the funds to the entity.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. In some instances, a sublabel is associated with a reference numeral to denote one of multiple similar components. When reference is made to a reference numeral without specification to an existing sublabel, it is intended to refer to all such multiple similar components.

DETAILED DESCRIPTION OF THE INVENTION

Aspects of the present application include a "bump" Smartphone application that allows two Smartphones to be "bumped" together in order to transfer money in much the same way that business cards can be exchanged. If person A owed person B money, person A would click on their money transfer application, enter the amount, and bump their device with person B's device, and person B would then accept or decline the funds.

Further aspects of the present invention include taking a picture of currency and based on the picture sending the customer the current exchange (FX) rate based on a country of origin or the geographical location of the device (i.e., Smartphone in the United States takes a picture of a Euro, the application sends the picture, identifies the currency as a Euro, and responds with the equivalent US Dollar value). A number of currency exchange locations would be presented for the customer to go to exchange the Euros for US currency.

Another aspect of the present invention includes a one-to-many social media application for a Smartphone to solicit a money transfer (e.g., a charitable organization, a relative, a cause, etc.). For example, an aid relief organization could send a message to a group of possible donors; the donors could then collaborate with the relief organization to define specifically what their funds would go towards. Once the donors are satisfied that the cause that they would like to support is defined, the application could be accessed to donate funds earmarked for that cause. Furthermore, the relief organization could periodically post updates, photos, etc. to generate more funds from the same set of donors for the cause.

Figure 1:
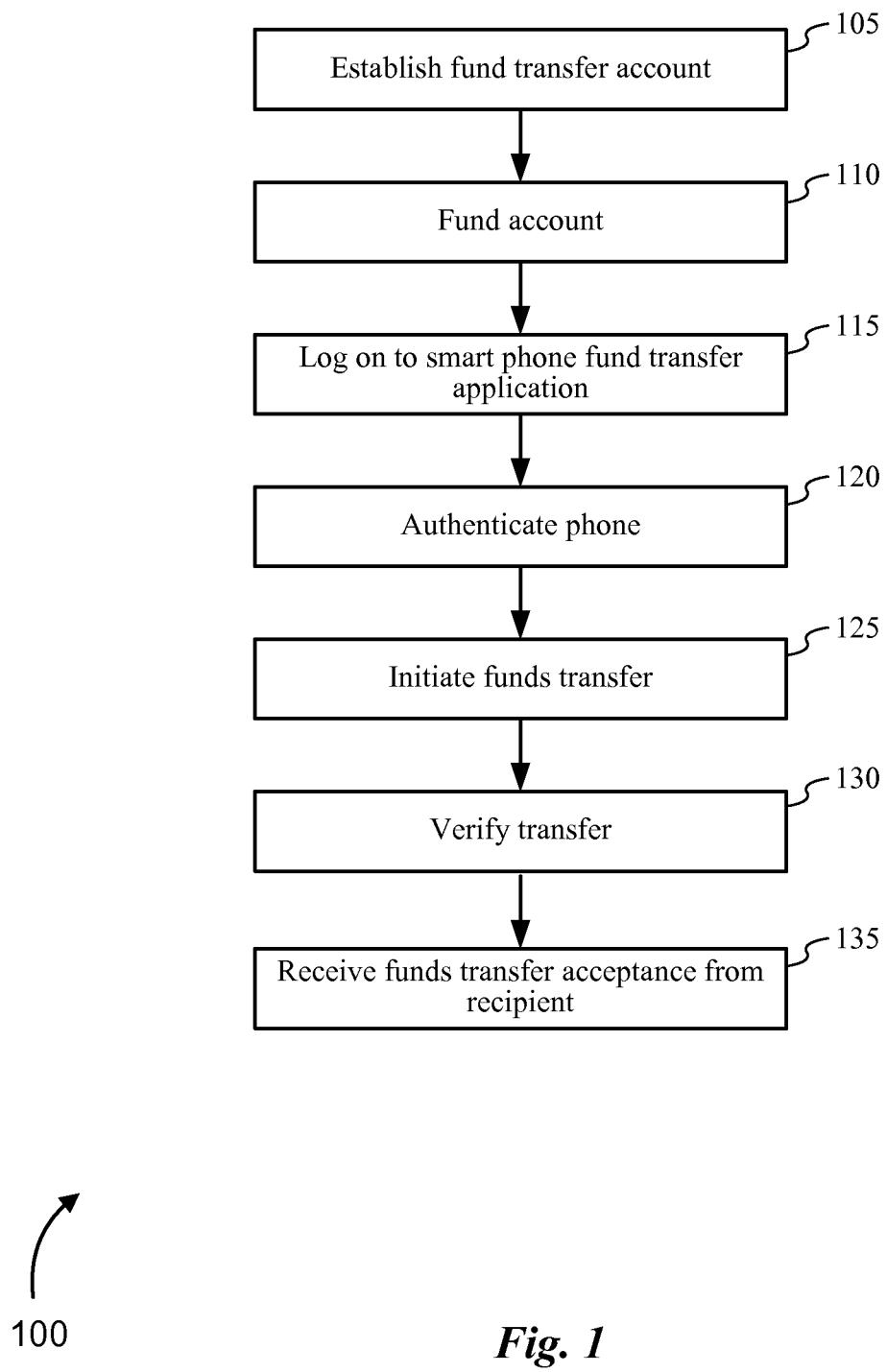
FIG. 1 is a flow diagram illustrating a method of transferring funds between mobile devices, according to one embodiment of the present invention.

Turning now to FIG. 1, which illustrates a method 100 of transferring funds between mobile devices, according to one embodiment of the present invention; at process block 105, a funds transfer account may be established for a customer. The account may be associated with a mobile device (e.g., a Smartphone), for example, with the SIM (or other identifier) of the mobile device. The account may be issued from or in conjunction with a telecommunications provider for the mobile device. The account may be maintained and provided by a third-party money transfer company, a utility company, a government agency, and the like.

At process block 110, the account may be funded. In one embodiment, the account may be funded by loading funds onto the account, or alternatively a credit (or pseudo-credit) relationship may be established with the entity holding the account such that a certain amount of funds may be used against the account (e.g., up to a limit). Furthermore, any charges to the account may also be billed to the customer. For example, the amount used against the account may appear on the account holder's utility bill, phone bill, etc.

In one embodiment, a Smartphone (or mobile phone) application may be installed on the mobile device. The application may be implemented to access the money transfer account to fund the account, check a balance, view pending transactions, etc. The application may have a secure login functionality (process block 115). In one embodiment, the mobile device may be authenticated (process block 120). For example, the mobile device's MAC address may be verified to ensure that the account is associated with the device, or alternatively the mobile device's SIM information may be verified.

Once the login and mobile device have been authenticated, a money (or funds) transfer may be initiated (process block 125). In one embodiment, a customer A may desire to transfer funds to customer B. Customer A may access the funds transfer application within their mobile device, and initiate a transfer with a transfer amount and a recipient. Customer B may be located near customer A, and through near field communication (e.g., Wi-Fi, Bluetooth, inferred, etc.) customer A's device and customer B's device may establish a communications link (e.g., "bump" customer A's device with customer B's device). In one embodiment, a "bump" is a device-to-device communication similar to exchanging business cards. Once customer A initiates a funds transfer, and verifies the transfer is correct (process block 130), a message may be sent to customer B's device indicating that a funds transfer is awaiting acceptance. In one embodiment, a pop-up (or similar) message may be displayed on Customer B's device. Alternatively, if customer B is not in the vicinity of customer A, then the message may be sent to customer B's device through an alternative communications path (e.g., cellular, Internet, etc.).

Furthermore, once customer B has received the funds transfer message, viewed the message, and accepted the funds, an acceptance message may be sent to customer A confirming that the funds transfer has been accepted and completed (process block 135). The balance would then either be drawn down from funds already associated with the account, or customer A would be billed (either on his/her next utility or phone bill, or through an alternative billing process).

Figure 2:
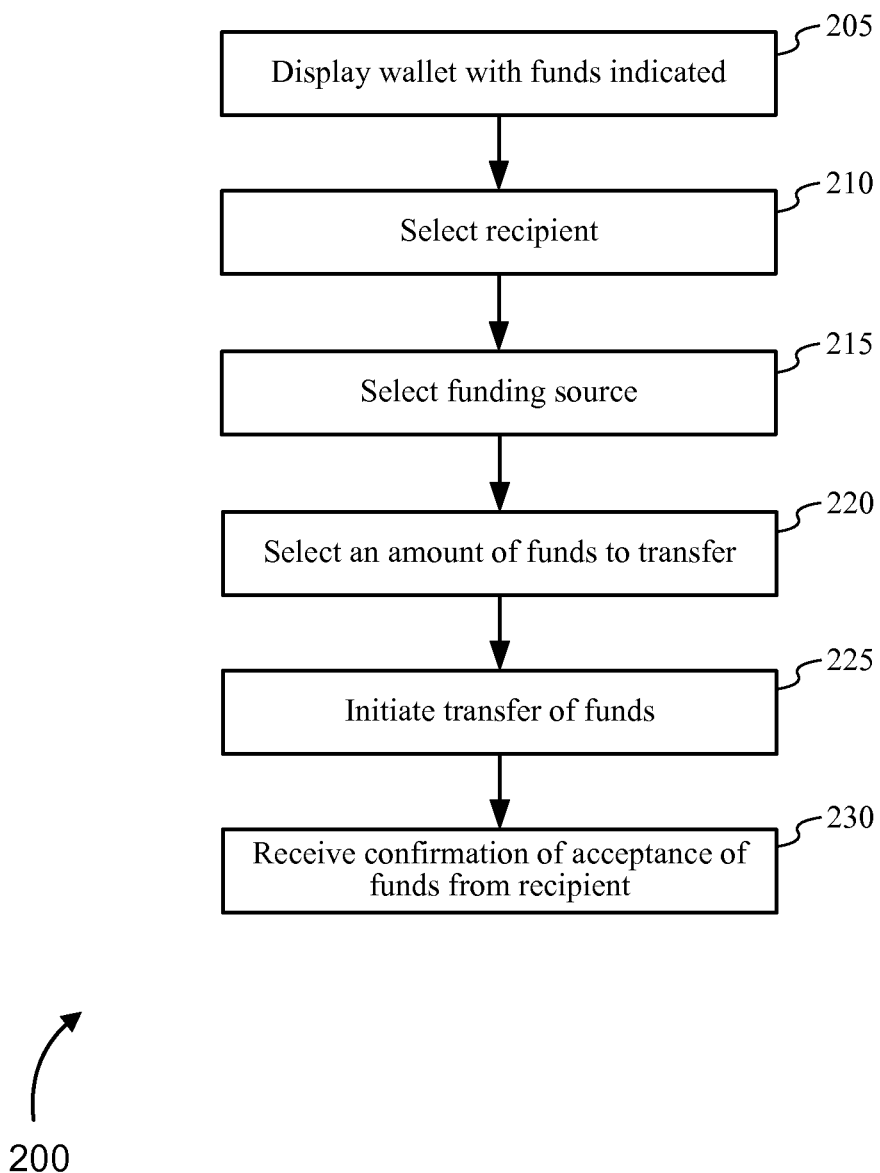
FIG. 2 is a flow diagram further illustrating a method of transferring funds between mobile devices, according to one embodiment of the present invention.

Referring now to FIG. 2, which illustrates a method 200 of transferring funds between mobile devices in conjunction with method 100, according to another embodiment of the present invention. At process block 205, within the mobile application a "wallet" may be displayed. In one embodiment, the wallet might be a virtual (or graphically represented) wallet. The wallet may depict "bills" and "coins" in various denominations which reflect the amount of funds stored within the account or available for used (i.e., based on the limit, available credit, etc.).

The application may provide an interface for selecting a recipient for the funds transfer (process block 210). The recipient list may be populated by a contact list, a transfer history list, a list of devices within a certain distance of the customer's device, etc. The customer may then select one or more recipients to initiate a funds transfer. At process block 215, a funding source may be selected. For example, the customer may drag bills and/or coins from the wallet and slide them over to the recipient's wallet (which is represented on the device's screen). Alternatively, a numeric value may be entered indicating the funding source and amount (process block 220).

Furthermore, funding sources may be selected. For example, the customer may have a utility account, a telephone account, and a mobile wallet account associated with the funds transfer account. As such, the customer may select any one or more of the accounts to fund the money transfer. Once the source, amount, and recipient have been selected/designated, the transfer of the funds may be initiated (process block 225). Accordingly, once the recipient has accepted and/or declined the money transfer, a notification may be sent through the application to be displayed on the mobile device (process block 230).

Figure 3:
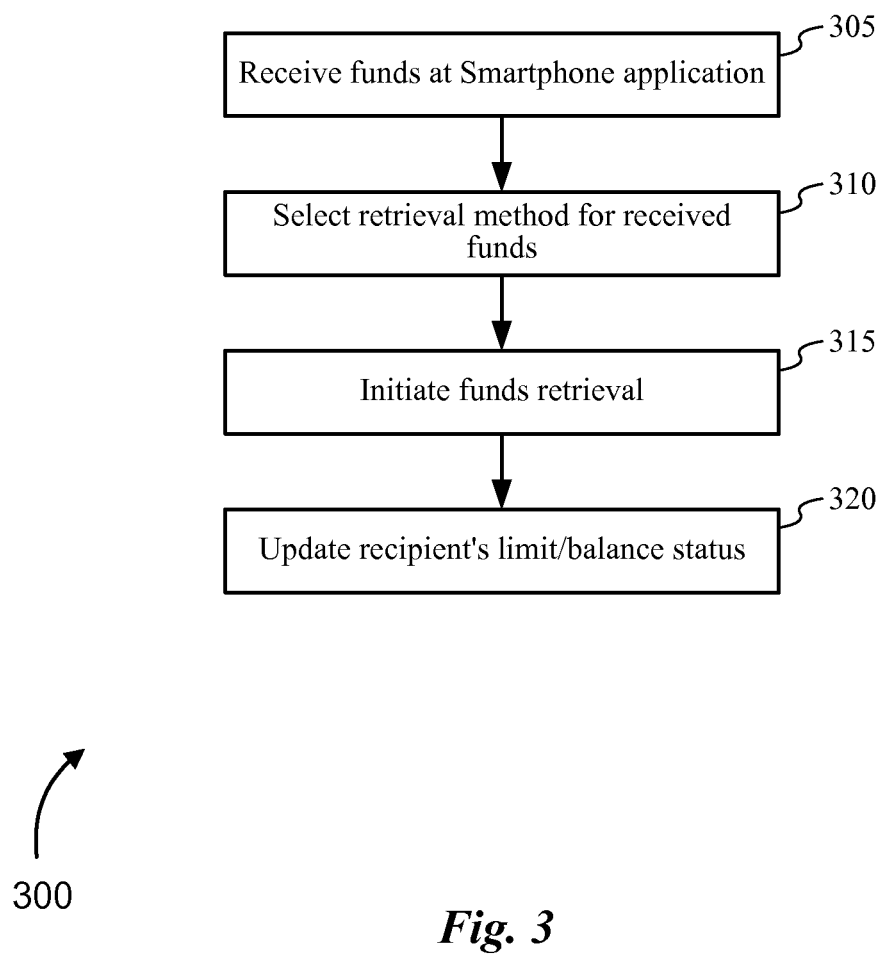
FIG. 3 is a flow diagram illustrating a method of transferring funds between mobile devices, according to another embodiment of the present invention.

Turning next to FIG. 3, a method 300 is illustrated of transferring funds between mobile devices, according to yet another embodiment of the present invention. At process block 305, a recipient of a funds transfer (or bump) may accept the transfer and receive the funds associated with the transfer. In one embodiment, the recipient may select the method for which he/she desires to receive the funds (process block 310). For example, the recipient may have the funds transferred into a bank account, on a credit account, to a mobile wallet, on a utility bill, etc. (process block 315). Alternatively, the funds may be placed within the account associated with the application on the device. Accordingly, the recipient's balance/limit status may then be updated and reflected within the application (process block 320). In one embodiment, additional bill/coins may be graphically displayed within the "wallet" as well as a graphical representation of the bill/coins moving into the wallet.

Figure 4:
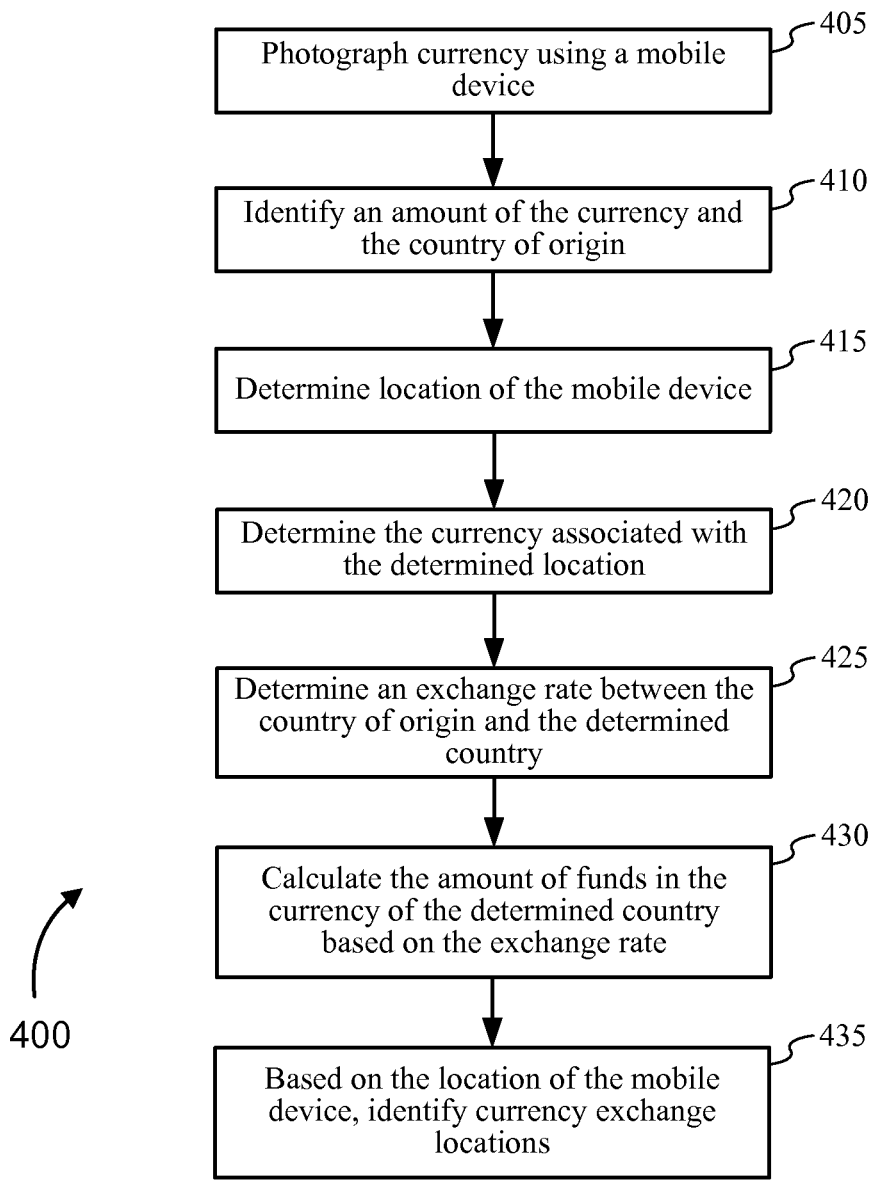
FIG. 4 is a flow diagram illustrating a method of converting funds from one currency to another currency, according to another embodiment of the present invention.

FIG. 4 illustrates a method 400 of converting funds from one currency to another currency, according to one embodiment of the present invention. At process block 405, a photograph (or digital image) of currency from a country is made. The digital image may be of more than one bill or more than one denomination (coins may also be in the image). Alternatively, an image of a single bill or coin may be taken, and within an application on, for example, a mobile device, an amount of the bills may be designated.

At process block 410, the amount of the currency in the image and the country of origin may be identified. For example, the currency may be identified (i.e., through recognition software and techniques) as United States currency. Furthermore, the bills may be identified as a twenty dollar bill and a ten dollar bill.

Further, the mobile device's location may be determined (process block 415). In one embodiment, a global positioning system (GPS) within the mobile device may be used to determine the current geographical position of the device. Alternatively, the customer may designate a default (or current position) by selecting a location from a list of locations, entering a zip of other address code, etc. Once the current location of the mobile device has been determined, a determination is made of the currency of the country at the current location (process block 420). For example, the country at the current location may be France, and the currency may be determined to be the Euro.

At process block 425, the exchange (FX) rate of the currency of the country at the current location is determined. The FX may be locked for a period of time, or may merely provide a snapshot of the current FX rate, which may change over time. At process block 430, the amount of in the country at the current location based on the amount of funds in the digital image may be calculated. Referring back to our above example, thirty dollars, at the determined FX rate, may be worth twenty-three Euros. Accordingly, the customer now knows the amount of local currency their currency is worth.

At process block 435, based on the determined current location, currency exchange locations may be identified. For example, a radius may be designated, and any exchange locations may be displayed with contact and/or direction information. In one embodiment, certain exchange locations may be preferred providers, which, if used, may provide a discounted exchange fee, or may be able to provide an FX lock.

In one embodiment, the FX lock may be provided as a barcode (or the like) that is displayed on the mobile device (Smartphone). The barcode may provide information about the locked FX rate (i.e., the rate value, the lock expiration, the exchange location associated with the locked rate, etc.). Furthermore, the customer could take the displayed barcode to an exchange location, have the barcode scanned (or otherwise read), and accordingly retrieve the locked FX rate.

Figure 5:
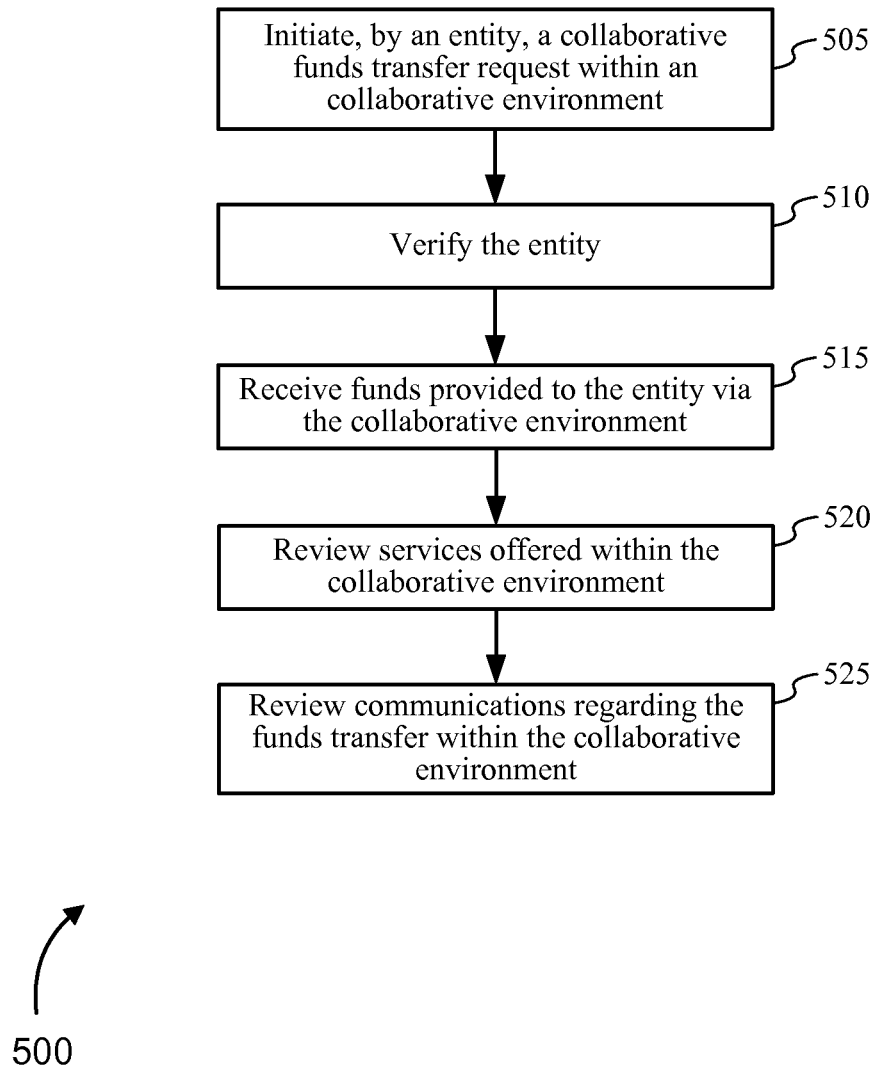
FIG. 5 is a flow diagram illustrating a method of implementing collaborative money transfer, which can be used in accordance with various embodiments of the invention.

Turning now to FIG. 5, a method 500 is illustrated of implementing collaborative money transfer, according to one embodiment of the present invention. At process block 505, a collaborative funds transfer request may be initiated by an entity (e.g., a charitable organization, a relief organization, etc.) within a collaborative environment (e.g., Google™ Wave, or the like). The collaborative funds transfer may be for relief funds (e.g., disaster relief, etc.) and the request may include photographs, information, etc. about the cause, relief effort, etc. Furthermore, members of the organization and/or donors to the fund may be able to post comments, pictures, and the like.

At process block 510, a verification of the organization may be provided in order to ensure that the relief effort is legitimate and to limit fraud. Also, this verification may be required in order to comply with any government and/or legal requirements regarding funds transfers. At process block 515, funds transfers may be initiated by members of the collaborative group from within the collaborative environment. The funds may then be received by the organization.

At process block 520, a review, within the collaborative environment, of the services offered (using the funds received from the donors) by the organization may be made. For example, the organization may post information about how the funds have been used, distributed, etc. At process block 525, communications, pictures, etc. may be posted to the collaborative environment, and the participants may review the posts and make determinations about how the funds have been used, comment about the organization, etc. As such, participants may be able to collaborate on a local, national, or international scale to provide funds to organizations they deem as worthwhile. At the same time, participants are able to provide feedback, share experiences, etc. about the relief effort and the organization.

Figure 6:
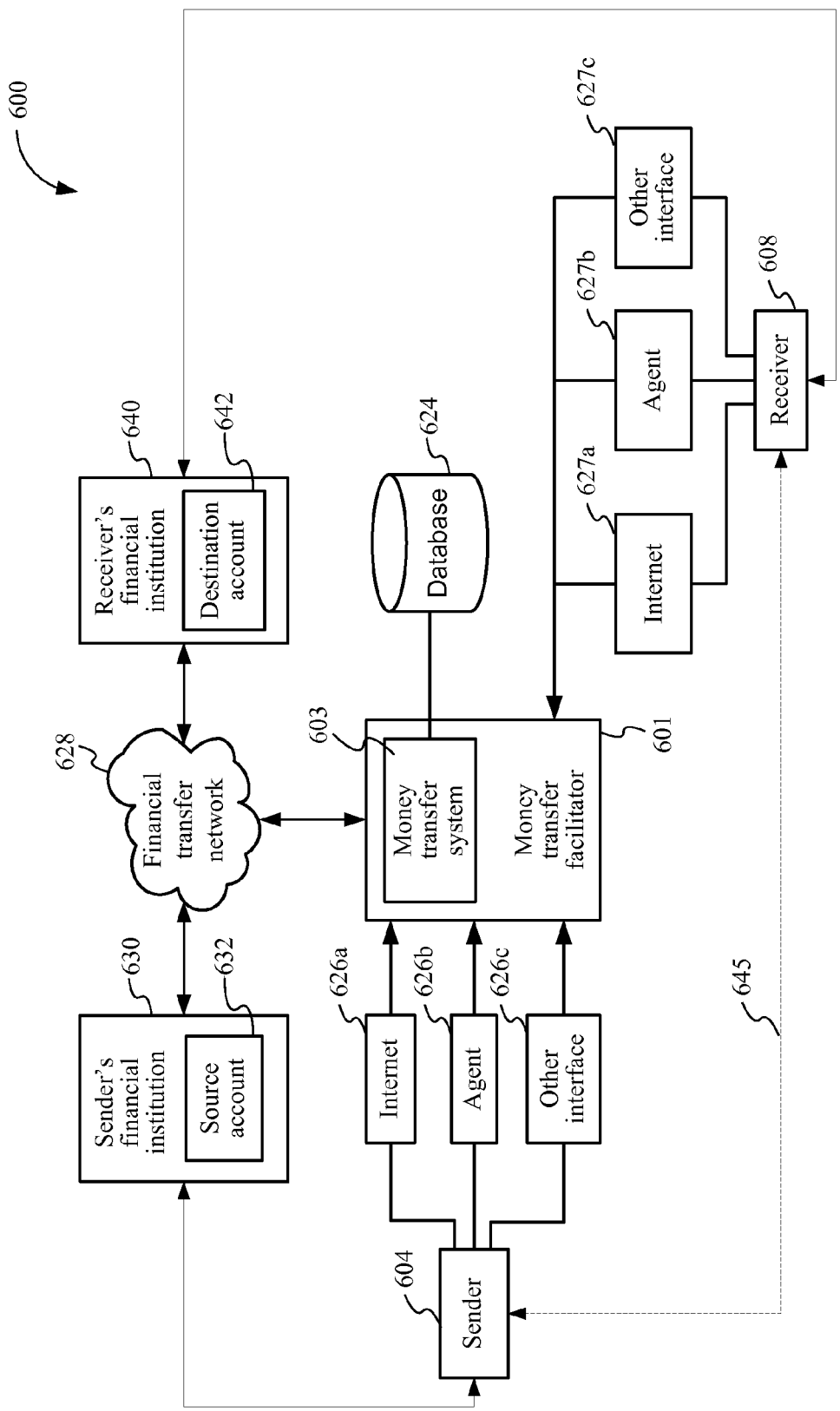
FIG. 6 is a block diagram illustrating a system for implementing any one of the methods described in FIGS. 1-5, according to one embodiment of the present invention.

Referring to FIG. 6, a system 600 is illustrated for implementing any one of the methods described in FIGS. 1-5, according to one embodiment of the present invention. System 600 includes a money transfer facilitator 601, which includes a money transfer system 603. A database 624 which includes customer account information may be in communication with money transfer system 603. Furthermore, system 600 may include a financial transfer network 628 in communication with money transfer facilitator 601, a sender's financial institution 630 (including a source account 632), and a receiver's financial institution 640 (including a destination account 642). In one embodiment, the financial institutions 630 and 640 may also be utility or telephone companies for which the sender 604 and/or receiver 608 have a funds transfer account established. Alternatively, sender 604 and/or receiver 608 may have funds transfer accounts established with money transfer facilitator 601 (as such, the financial institutions 630 and 640 may not be needed).

One example of how system 600 may be used is that sender 604 wants to "bump" funds to receiver 608 via near-field communication link 645. The steps in methods 100, 200, and 300 in FIGS. 1-3 may be performed using system 600. In one embodiment, account establishment, funds transfer, etc. may occur between sender 604 and money transfer facilitator 601 via one or more of the Internet 626*a*, an agent location 626*b*, or another interface 626*c*. Similarly, receiver 608 may communicate with money transfer facilitator 601 via the Internet 627*a*, an agent location 627*b*, or another interface 627*c*. Furthermore, system 600 may be used to implement method 400 in FIG. 4 and method 500 in FIG. 5.

Figure 7:
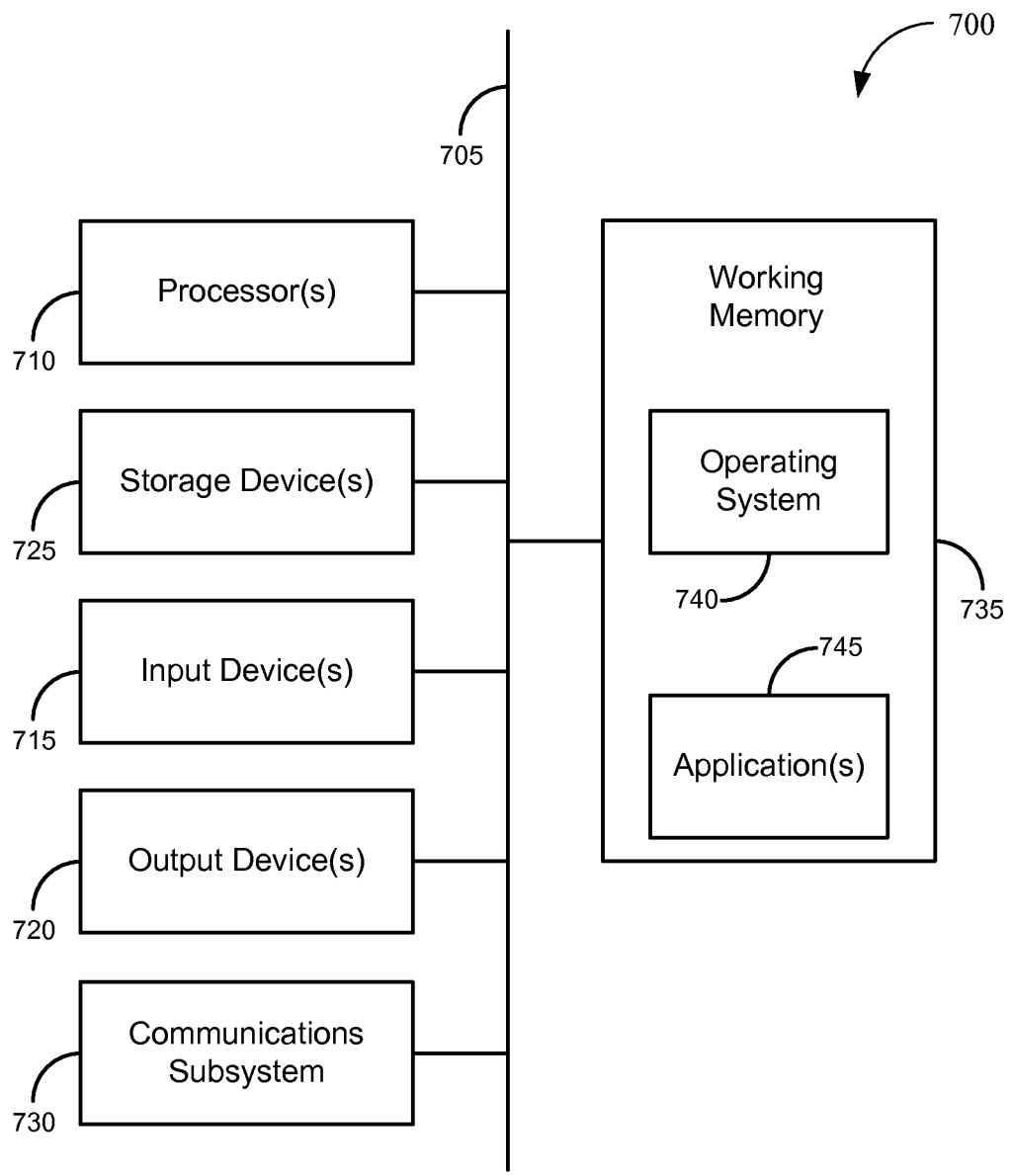
FIG. 7 is a generalized schematic diagram illustrating a computer system, in accordance with various embodiments of the invention.

FIG. 7 provides a schematic illustration of one embodiment of a computer system 700 that can perform the methods of the invention, as described herein, and/or can function as, for example, the money transfer facilitator 601. It should be noted that FIG. 7 is meant only to provide a generalized illustration of various components, any or all of which may be utilized as appropriate. FIG. 7, therefore, broadly illustrates how individual system elements may be implemented in a relatively separated or relatively more integrated manner.

The computer system 700 is shown comprising hardware elements that can be electrically coupled via a bus 705 (or may otherwise be in communication, as appropriate). The hardware elements can include one or more processors 710, including, without limitation, one or more general-purpose processors and/or one or more special-purpose processors (such as digital signal processing chips, graphics acceleration chips, and/or the like); one or more input devices 715, which can include, without limitation, a mouse, a keyboard and/or the like; and one or more output devices 720, which can include, without limitation, a display device, a printer and/or the like.

The computer system 700 may further include (and/or be in communication with) one or more storage devices 725, which can comprise, without limitation, local and/or network accessible storage and/or can include, without limitation, a disk drive, a drive array, an optical storage device, a solid-state storage device, such as a random access memory ("RAM") and/or a read-only memory ("ROM"), which can be programmable, flash-updateable and/or the like. The computer system 700 might also include a communications subsystem 730, which can include without limitation a modem, a network card (wireless or wired), an infra-red communication device, a wireless communication device and/or chipset (such as a Bluetooth™ device, an 802.11 device, a WiFi device, a WiMax device, cellular communication facilities, etc.), and/or the like. The communications subsystem 730 may permit data to be exchanged with a network, and/or any other devices described herein. In many embodiments, the computer system 700 will further comprise a working memory 735, which can include a RAM or ROM device, as described above.

The computer system 700 can also comprise software elements, shown as being currently located within the working memory 735, including an operating system 740 and/or other code, such as one or more application programs 745, which may comprise computer programs of the invention, and/or may be designed to implement methods of the invention and/or configure systems of the invention, as described herein. Merely by way of example, one or more procedures described with respect to the method(s) discussed above might be implemented as code and/or instructions executable by a computer (and/or a processor within a computer). A set of these instructions and/or code might be stored on a computer-readable storage medium, such as the storage device(s) 725 described above. In some cases, the storage medium might be incorporated within a computer system, such as the system 700. In other embodiments, the storage medium might be separate from a computer system (e.g., a removable medium, such as a compact disc, etc.), and/or provided in an installation package, such that the storage medium can be used to program a general purpose computer with the instructions/code stored thereon. These instructions might take the form of executable code, which is executable by the computer system 700 and/or might take the form of source and/or installable code, which, upon compilation and/or installation on the computer system 700 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection with other computing devices such as network input/output devices may be employed.

In one aspect, the invention employs a computer system (such as the computer system 700) to perform methods of the invention. According to a set of embodiments, some or all of the procedures of such methods are performed by the computer system 700 in response to processor 710 executing one or more sequences of one or more instructions (which might be incorporated into the operating system 740 and/or other code, such as an application program 745) contained in the working memory 735. Such instructions may be read into the working memory 735 from another machine-readable medium, such as one or more of the storage device(s) 725. Merely by way of example, execution of the sequences of instructions contained in the working memory 735 might cause the processor(s) 710 to perform one or more procedures of the methods described herein.

The terms "machine-readable medium" and "computer readable medium", as used herein, refer to any medium that participates in providing data that causes a machine to operate in a specific fashion. In an embodiment implemented using the computer system 700, various machine-readable media might be involved in providing instructions/code to processor(s) 710 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media includes, for example, optical or magnetic disks, such as the storage device(s) 725. Volatile media includes, without limitation, dynamic memory, such as the working memory 735. Transmission media includes coaxial cables, copper wire and fiber optics, including the wires that comprise the bus 705, as well as the various components of the communication subsystem 730 (and/or the media by which the communications subsystem 730 provides communication with other devices). Hence, transmission media can also take the form of waves (including without limitation radio, acoustic and/or light waves, such as those generated during radio-wave and infra-red data communications).

Common forms of physical and/or tangible computer-readable media include, for example, a floppy disk, a flexible disk, hard disk, magnetic tape, or any other magnetic medium, a CD-ROM, any other optical medium, punch-cards, papertape, any other physical medium with patterns of holes, a RAM, a PROM, an EPROM, a FLASH-EPROM, any other memory chip or cartridge, a carrier wave as described hereinafter, or any other medium from which a computer can read instructions and/or code.

Various forms of machine-readable media may be involved in carrying one or more sequences of one or more instructions to the processor(s) 710 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 700. These signals, which might be in the form of electromagnetic signals, acoustic signals, optical signals and/or the like, are all examples of carrier waves on which instructions can be encoded, in accordance with various embodiments of the invention.

The communications subsystem 730 (and/or components thereof) generally will receive the signals, and the bus 705 then might carry the signals (and/or the data, instructions, etc., carried by the signals) to the working memory 735, from which the processor(s) 705 retrieves and executes the instructions. The instructions received by the working memory 735 may optionally be stored on a storage device 725 either before or after execution by the processor(s) 710.

It should be noted that the methods, systems, and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted, or combined. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the invention.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the necessary tasks may be stored in a computer-readable medium such as a storage medium. Processors may perform the necessary tasks.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

What is claimed is:

1. A method of transferring funds between mobile devices, the method comprising:
    establishing a first funds transfer account associated with a first mobile device and a second funds transfer account associated with a second mobile device;
    funding at least the first funds transfer account;
    selecting the second mobile device as recipient of a funds transfer from the first mobile device, wherein selecting the second mobile device as the recipient of the funds transfer comprises:
        receiving an initiation of a device-to-device funds transfer mobile application on the first mobile device;
        in response to the initiation of the device-to-device funds transfer mobile application on the first mobile device, providing an interface on the first mobile device including a potential recipient list;
        determining a set of compatible mobile devices within a predetermined distance of the first mobile device, onto which the device-to-device funds transfer mobile application is also installed, in response to the initiation of the device-to-device funds transfer mobile application on the first mobile device;
        populating the potential recipient list displayed via the interface on the first mobile device with: one or more potential recipients retrieved from a contact list stored on the first mobile device, one or more potential recipients retrieved from a transfer history list associated with the first mobile device, and one or more potential recipients based on the determined set of compatible mobile devices within the predetermined distance of the first mobile device; and
        receiving a user selection of the second mobile device from the potential recipient list, as the recipient of the funds transfer from the first mobile device;
    establishing a communications link between the first mobile device and the second mobile device, wherein establishing the communications link comprises:
        determining whether the first mobile device is in the vicinity of the second mobile device;
        upon determining that the first mobile device is in the vicinity of the second mobile device, sending a direct near field communications link request from the first mobile device to the second mobile device; and
        in response to an acceptance, establishing a direct communications link between the first mobile device and the second mobile device;
    initiating, via the device-to-device funds transfer mobile application, a funds transfer from the first mobile device to the second mobile device, wherein an amount of the funds transfer is designated at the first mobile device; and
    transferring the amount to the second funds transfer account associated with second mobile device.

2. The method of transferring funds between mobile devices as in claim 1, wherein the first funds transfer account and the second funds transfer account each have an associated funding or balance limit.

3. The method of transferring funds between mobile devices as in claim 2, further comprising:
    presenting a plurality of fund retrieval options at the second mobile device;
    receiving a selection of the plurality of fund retrieval options; and
    transferring the funds to the selected fund retrieval option.

4. The method of transferring funds between mobile devices as in claim 3, further comprising, based on the transfer of the funds, updating the second funds transfer account funding or balance limit.

5. The method of transferring funds between mobile devices as in claim 1, wherein the mobile device comprises one or more of the following: a Smartphone, a personal digital assistant (PDA), a mobile computer, a kiosk, and an automated teller machine (ATM).

6. The method of transferring funds between mobile devices as in claim 1, further comprising:
    displaying on a display screen of the second device the direct near field communications link request; and
    receiving acceptance of the communications link request from the second mobile device.

7. The method of transferring funds between mobile devices as in claim 1, further comprising verifying, by a processing center, the funds transfer amount, the first funds transfer account, and the second funds transfer account.

8. The method of claim 1, wherein the initiating of the funds transfer from the first mobile device to the second mobile device comprises:

graphically representing a wallet to include bills and coins in a plurality of denominations which reflect an amount of funds stored within the first funds transfer account and available for use on the first mobile device; and receiving input at the first mobile device which includes dragging and sliding the bills and the coins from the wallet over to the second mobile device in the amount of the funds transfer.

9. The method of claim 1, further comprising:

prior to initiating the funds transfer from the first mobile device to the second mobile device, performing a first authentication process on a user of the first mobile device and a separate second authentication process on the first mobile device.

10. The method of claim 9, wherein the first authentication process comprises a secure login via the device-to-device funds transfer mobile application executing on the first mobile device, and wherein the second authentication process comprises verifying at least one of a MAC address of the first mobile device or SIM information of the first mobile device.

11. The method of transferring funds between mobile devices as in claim 1, wherein the user selection made via the interface on the first mobile device selects multiple recipients from the potential recipient list as recipients of the funds transfer.

12. The method of transferring funds between mobile devices as in claim 1, further comprising:

in response to the initiation of the device-to-device funds transfer mobile application on the first mobile device, providing a second interface on the first mobile device including a potential funding accounts list comprising a plurality of funded accounts associated with the first mobile device;

receiving a user selection of multiple accounts from the potential funding accounts list displayed via the second interface on the first mobile device; and funding the funds transfer from the first mobile device to the second mobile device using the multiple accounts selected via the second interface.

13. The method of transferring funds between mobile devices as in claim 12, wherein the potential funding accounts list displayed via the second interface on the first mobile device includes a first account corresponding to a financial account of a financial institution, and a second account associated with the device-to-device funds transfer mobile application on the first mobile device.

14. A method of transferring funds between mobile devices, the method comprising:

establishing a first funds transfer account associated with a first mobile device and a second funds transfer account associated with a second mobile device;

funding at least the first funds transfer account, wherein the first funds transfer account is associated with a utilities account for a utility company;

selecting the second mobile device as recipient of a funds transfer from the first mobile device, wherein selecting the second mobile device as the recipient of the funds transfer comprises:

receiving an initiation of a device-to-device funds transfer mobile application on the first mobile device;

in response to the initiation of the device-to-device funds transfer mobile application on the first mobile device, providing an interface on the first mobile device including a potential recipient list;

determining a set of compatible mobile devices within a predetermined distance of the first mobile device, onto which the device-to-device funds transfer mobile application is also installed, in response to the initiation of the device-to-device funds transfer mobile application on the first mobile device;

populating the potential recipient list displayed via the interface on the first mobile device with: one or more potential recipients retrieved from a contact list stored on the first mobile device, one or more potential recipients retrieved from a transfer history list associated with the first mobile device, and one or more potential recipients based on the determined set of compatible mobile devices within the predetermined distance of the first mobile device; and receiving a user selection of the second mobile device from the potential recipient list, as the recipient of the funds transfer from the first mobile device;

establishing a communications link between the first mobile device and the second mobile device, wherein establishing the communications link comprises:

determining whether the first mobile device is in the vicinity of the second mobile device;

upon determining that the first mobile device is in the vicinity of the second mobile device, sending a direct near field communications link request from the first mobile device to the second mobile device, wherein the second mobile device is controlled by the utility company; and in response to an acceptance, establishing a direct communications link between the first mobile device and the second mobile device;

initiating, via the device-to-device funds transfer mobile application, a funds transfer from the first mobile device to the second mobile device, wherein an amount of the funds transfer is designated at the first mobile device, and wherein the initiating of the funds transfer from the first mobile device to the second mobile device comprises:

graphically representing a wallet to include bills and coins in a plurality of denominations which reflect an amount of funds stored within the first funds transfer account and available for use on the first mobile device, and receiving input at the first mobile device which includes dragging and sliding the bills and the coins from the wallet over to the second mobile device in the amount of the funds transfer; and in response to receiving the input, transferring the amount to the second funds transfer account associated with second mobile device.

15. A non-transitory computer-readable medium having sets of instructions stored thereon which, when executed by a computer, cause the computer to:

establish a first funds transfer account associated with a first mobile device and a second funds transfer account associated with a second mobile device;

fund at least the first funds transfer account;

select the second mobile device as recipient of a funds transfer from the first mobile device, wherein selecting the second mobile device as the recipient of the funds transfer comprises:

receiving an initiation of a device-to-device funds transfer mobile application on the first mobile device;

in response to the initiation of the device-to-device funds transfer mobile application on the first mobile device, providing an interface on the first mobile device including a potential recipient list;

determining a set of compatible mobile devices within a predetermined distance of the first mobile device, onto which the device-to-device funds transfer mobile application is also installed, in response to the initiation of the device-to-device funds transfer mobile application on the first mobile device;

populating the potential recipient list displayed via the interface on the first mobile device with: one or more potential recipients retrieved from a contact list stored on the first mobile device, one or more potential recipients retrieved from a transfer history list associated with the first mobile device, and one or more potential recipients based on the determined set of compatible mobile devices within the predetermined distance of the first mobile device; and receiving a user selection of the second mobile device from the potential recipient list, as the recipient of the funds transfer from the first mobile device;

establish a direct communications link between the first mobile device and the second mobile device, wherein establishing the communications link comprises:

determining whether the first mobile device is in the vicinity of the second mobile device;

upon determining that the first mobile device is in the vicinity of the second mobile device, sending a direct near field communications link request from the first mobile device to the second mobile device; and in response to an acceptance, establishing a direct communications link between the first mobile device and the second mobile device;

initiate, via the device-to-device funds transfer mobile application, a funds transfer from the first mobile device to the second mobile device, wherein an amount of the funds transfer is designated at the first mobile device; and transfer the amount to the second funds transfer account associated with second mobile device.

16. The non-transitory computer-readable medium as in claim 15, wherein the first funds transfer account and the second funds transfer account each have an associated funding or balance limit.

17. The non-transitory computer-readable medium of claim 15, wherein the initiating of the funds transfer from the first mobile device to the second mobile device comprises:

graphically representing a wallet to include bills and coins in a plurality of denominations which reflect an amount of funds stored within the first funds transfer account and available for use on the first mobile device; and receiving input at the first mobile device which includes dragging and sliding the bills and the coins from the wallet over to the second mobile device in the amount of the funds transfer.

18. The non-transitory computer-readable medium of claim 15, further comprising:

prior to initiating the funds transfer from the first mobile device to the second mobile device, performing a first authentication process on a user of the first mobile device and a separate second authentication process on the first mobile device.

19. The non-transitory computer-readable medium of claim 18, wherein the first authentication process comprises a secure login via the device-to-device funds transfer mobile application executing on the first mobile device, and wherein the second authentication process comprises verifying at least one of a MAC address of the first mobile device or SIM information of the first mobile device.

* * * * *